US010607248B2

(12) United States Patent
Kim

(10) Patent No.: US 10,607,248 B2
(45) Date of Patent: Mar. 31, 2020

(54) TIME-CONSUMING SALE PROCESS

(71) Applicant: Jae Kyun Kim, Arlington, VA (US)

(72) Inventor: Jae Kyun Kim, Arlington, VA (US)

( * ) Notice: Subject to any disclaimer, the term of this patent is extended or adjusted under 35 U.S.C. 154(b) by 351 days.

(21) Appl. No.: 15/490,719

(22) Filed: Apr. 18, 2017

(65) Prior Publication Data

US 2018/0300743 A1 Oct. 18, 2018

(51) Int. Cl.
*G06Q 30/00* (2012.01)
*G06Q 30/02* (2012.01)

(52) U.S. Cl.
CPC ..... *G06Q 30/0235* (2013.01); *G06Q 30/0222* (2013.01)

(58) Field of Classification Search
CPC .... G06Q 30/00; G06Q 30/0601; G06Q 30/06; G06Q 30/0641
See application file for complete search history.

(56) References Cited

U.S. PATENT DOCUMENTS

| | | | | |
|---|---|---|---|---|
| 4,887,818 A * | 12/1989 | Escott | ................. | A63F 3/00088 273/254 |
| 7,383,206 B2 | 6/2008 | Rupp | | |
| 7,617,128 B2 | 11/2009 | Greak | | |
| 7,933,798 B1 * | 4/2011 | Yan | ........................ | G06Q 30/02 705/14.42 |
| 8,046,294 B2 * | 10/2011 | Zhou | .................. | G06Q 30/0244 705/14.43 |
| 8,277,320 B1 * | 10/2012 | Hart | .................... | G07F 17/3274 463/42 |
| 8,365,241 B1 * | 1/2013 | Gunda | .................... | H04L 67/02 726/1 |
| 2002/0077953 A1 * | 6/2002 | Dutta | ..................... | G06Q 10/02 705/37 |
| 2003/0055729 A1 * | 3/2003 | Bezos | .................... | G06Q 30/02 705/14.31 |
| 2005/0289017 A1 * | 12/2005 | Gershom | ............... | G06Q 30/06 705/26.3 |

(Continued)

OTHER PUBLICATIONS

Bhunia, A., et al. "An inventory model of two-warehouse system with variable demand dependent on instantaneous displayed stock and marketing decisions via hybrid RCGA." International Journal of Industrial Engineering Computations 2.2 (2011): 351-368. (Year: 2011).*

*Primary Examiner* — Christopher B Seibert
(74) *Attorney, Agent, or Firm* — Gregory M. MacDonald, Esq.

(57) ABSTRACT

The present invention relates generally to a method where the price of a commodity open for sale decreases from the seller-entered preset initial price to the seller-entered preset bottom price during the given period of time, and buyers who are willing to buy the commodity may participate in the active price reduction sale. A deal is made once any of the participants selects the price displayed during the market time. The same item that the seller has multiple stock can be marketed altogether, partially or one by one in separate or the same spaces online. Also, the seller can sell multiple different items in the platform using various settings. The deal can be made between commercial retailers, individual sellers or any other entities and buyers online. The commodity may include new or used items, services, tickets, and other items that can be marketable online.

16 Claims, 9 Drawing Sheets

(56) References Cited

U.S. PATENT DOCUMENTS

| | | | | |
|---|---|---|---|---|
| 2005/0289039 | A1* | 12/2005 | Greak | G06Q 30/0609 705/37 |
| 2007/0083611 | A1* | 4/2007 | Farago | H04L 67/20 709/217 |
| 2007/0113250 | A1* | 5/2007 | Logan | H04N 7/17336 725/46 |
| 2007/0276747 | A1* | 11/2007 | Campbell | G06Q 40/04 705/37 |
| 2008/0103938 | A1* | 5/2008 | Fisher | G06Q 30/0601 705/26.1 |
| 2008/0133258 | A1* | 6/2008 | Kontogouris | G06Q 10/0875 705/29 |
| 2009/0012868 | A1* | 1/2009 | DeAngelis | G06Q 30/02 705/14.5 |
| 2009/0129377 | A1* | 5/2009 | Chamberlain | G06Q 30/0201 370/389 |
| 2009/0248522 | A1* | 10/2009 | Hu | G06Q 30/02 705/14.71 |
| 2009/0325685 | A1* | 12/2009 | Webb | A63F 13/12 463/25 |
| 2010/0324973 | A1* | 12/2010 | D'Ambrosio | G06Q 30/02 705/26.3 |
| 2011/0288928 | A1* | 11/2011 | Patwa | G06Q 30/02 705/14.42 |
| 2012/0058742 | A1* | 3/2012 | Razoumov | H04L 12/5691 455/406 |
| 2012/0123928 | A1* | 5/2012 | Baggott | G06Q 30/08 705/37 |
| 2013/0304599 | A1* | 11/2013 | Vincent | G06Q 30/08 705/26.3 |
| 2014/0236725 | A1* | 8/2014 | Golden | G06Q 30/0261 705/14.58 |
| 2014/0304089 | A1* | 10/2014 | Lee | G06Q 30/0275 705/14.71 |
| 2017/0161793 | A1* | 6/2017 | Knapp | G06Q 30/02 |

* cited by examiner

TIME-CONSUMING SALE PROCESS

CROSS-REFERENCE TO RELATED APPLICATION

This application claims the benefit of U.S. Provisional Patent Application No. 62/338,720 the entire contents of which is hereby incorporated herein by reference for all purposes as if fully set forth herein, under 35 U.S.C. 119(e).

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention relates generally to selling an item on a virtual marketplace. More specifically, the present invention is a method of selling an item at an instantaneous price that occurs in accordance to a predetermined time interval during the process of a sale.

2. Description of Related Art

Methods are known where a buyer may initiate a "reverse auction" by requesting offers from sellers, so sellers compete, and the buyer obtains the desired service or product at the lowest price. However, these methods often require a seller to first consider "interacting variables" before providing a price. These interacting variables may include the seller's revenue target, profit target, market share target, inventory status, discount rates from its own suppliers, promotion, pricing forecasts from historic market data, competition from other sellers, and the profile of potential buyers. Thus, the process is not fully automated, since many variables still need to be determined before an agreement is reached between the buyer and the seller. Also, the sellers must submit one or more quotes to the buyer, who needs to evaluate these before deciding.

Another disadvantage with existing methods is that there is generally no competition between the sellers and potential buyers for the services and products requested. Thus, sellers may be discouraged to participate in such a process, since a single buyer may be demanding an unreasonably low price, or the seller's chances of completing a transaction are relatively low. In addition, existing methods only allow the buyer to see the best price that the engine seller will offer.

Accordingly, there is a need for a method of selling an item via a virtual marketplace, which is fully automated in that the sellers do not need to submit quotes to the potential buyers. There is also a need for a method that allows multiple buyers to participate to create competition between buyers for goods or services, so that sellers are not discouraged from participating in the process by a single buyer. In addition, there is a need for a method where buyers will be in the same virtual market place online at the same time, see actual real-time price changes, and compete with each other, where a buyer selects the price he is willing to pay for a good or service in light of the trade-offs of either buying sooner at a relatively higher price to ensure that he obtains the good or service, or waiting for the price to go lower and risk that another buyer may purchase the particular goods or services. Furthermore, there is a need for a method where multiple stock of items may be marketed together, to allow multiple different items to be sold on the same platform, and to allow deals to be made between commercial retailers, individual sellers, and buyers online. Moreover, there is a need for a method where the potential buyers are aware of the ceiling price and the floor price prior to the sales transaction with the knowledge that the price can only decrease to facilitate buyer competition and reduce the amount of time required to sell an item. The method described in this patent application fulfills at least one of these needs or creates other utility.

BRIEF SUMMARY OF THE INVENTION

It is a principal object to solve at least one of the disadvantages with other attempted solutions or to create other utility by providing a method that allows for the selling of items via a virtual marketplace. Such a marketplace may allow (1) multiple stock of items to be marketed together using single or multiple algorithms, (2) multiple different items to be sold on the same platform using single or multiple algorithms, or (3) deals to be made between commercial retailers, individual sellers, or any other sellers and buyers online. The present invention relates generally to a method of calculating an instantaneous sales price at a predetermined time interval in accordance with a predetermined algorithm.

The embodiment of this invention assumes that variables, such as price range for a service or product, revenue target, profit target, market share target, inventory status, discount rates from its own suppliers, promotion, pricing forecasts from historic market data, seller competitions, and the buyer profile have already been considered by the seller in advance of any transaction between the buyer and the seller. In addition, this invention mitigates the uncertainty of pricing that cannot embrace the seller's and the buyer's expectation at a fixed price. Thus, in the embodiment of this invention, a seller, who expresses their interest in participating in the process is assumed to know (1) the price range it can offer to potential buyers after considering profit, revenue, and inventory, and (2) the potential buyers who are willing to purchase the service or product within this price range. Therefore, in the embodiment of this invention, the sellers do not need to submit individual quotes to the potential buyers. Thus, agreements may be automatically reached within this process without further input from the buyer or seller after the sales process begins.

The embodiment of this invention gather potential buyers through presenting the price range of a commodity. Buyers will be in the same virtual market place online at the same time, and they compete each other considering between the trade-offs of either waiting for a lower price or not waiting and buying at a relatively higher price in the considering the best utility they pursue.

In contrast, the embodiment of this invention allows buyers to see actual real-time price changes on a continuous basis over a very short period. This allows a buyer to find his own best price within the range, when the buyer participates in the process. The curve in the embodiment of this invention is a tactic from the seller's side, which considers the psychological effects of buyers.

In the embodiment of this invention buyers will compete each other in the market place that they participate in. In doing so, the buyers may already be aware of the ceiling and floor prices along with the time for selling, which may be as short as a few minutes.

The Time-Consuming Sale Process of the present invention is an e-commerce process where the price of a commodity is tied to time flow. The process may be implemented via a platform where sellers can upload items for sale and open marketplaces, and buyers can participate in one or multiple marketplaces for purchase.

The basic mechanism of the process is that the price of a commodity open for sale decreases from the seller-entered preset initial price to the seller-entered preset bottom price during the given period (hereinafter "market time"), and "customers who are willing to buy the commodity" (hereinafter "participants") can participate in the active price reduction sale. A deal is made once any of the participants selects the price displayed during the market time. The same item that the seller has multiple stock can be marketed altogether, partially or one by one in separate or the same spaces online. Also, the seller can sell multiple different items in the platform using various settings. The deal can be made between commercial retailers, individual sellers or any other entities (hereinafter "seller") and buyers online.

The commodity may include new or used items, services, tickets or others (hereinafter "item") that can be marketable online. Details of the process are described below by number that corresponds to the flow charts for the Single Item Deal Model as shown in FIG. 4 through 6 and the Multiple Items Deal Model as shown in FIGS. 7 through 9.

BRIEF DESCRIPTION OF THE DRAWINGS

The accompanying drawings, which are incorporated in and constitute a part of this specification, illustrate several aspects described below.

DETAILED DESCRIPTION OF THE INVENTION

Figure 1:
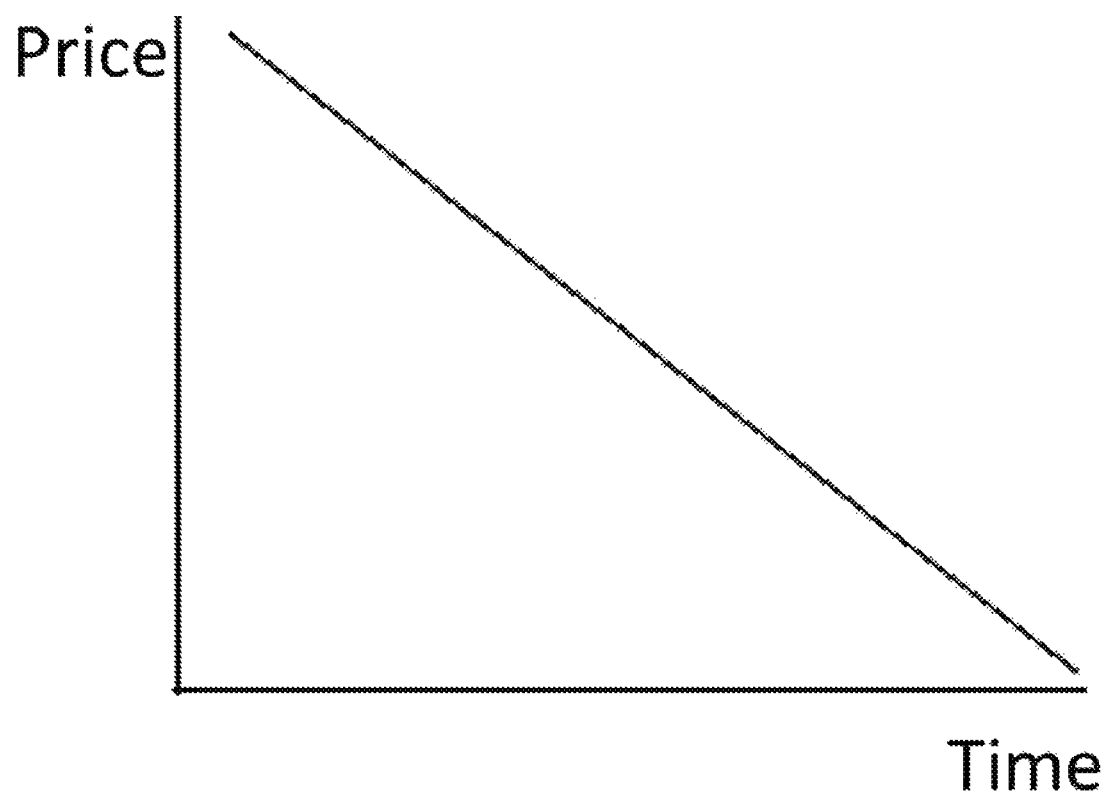
FIG. 1 is an example of a graph of a sales price changing proportionally over time in at least one embodiment of the method of the present invention.

It is to be understood that this invention is not limited to any particular embodiment described, which may vary. Also, it is to be understood that the terminology used herein is for describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without all of these specific details. Thus, all illustrations of the drawings are for describing versions of the present invention, and are not intended to limit the scope of the invention.

In the following section, the present invention is described fully by referencing the details in the enclosed drawings, which illustrate certain embodiments of the invention. The numbers shown in this specification refer to the corresponding numbers in the enclosed drawings and do not limit the order of the process that is interchangeable when necessary. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

The methods described below are intended to be exemplary only. While certain operations are labeled as a "step," it is noted that the term "step" is not intended to be limiting of the present invention. One or more steps may be combined and processed simultaneously without departing from the scope of the present invention.

The present invention is intended to be implemented in software, hardware, and the combination of software and hardware. The present invention is contemplated to involve a seller terminal connected to a buyer terminal via the Internet. Accordingly, the seller is contemplated to access the Internet via a personal computer, smart phone, tablet, or another suitable device. This is referred to herein as "the seller device." Similarly, a buyer is contemplated to access the Internet via a personal computer, smart phone, tablet, or another suitable device. This is referred to as the "buyer device." Still further, as should be apparent to those skilled in the art, one or more servers are contemplated to connect the seller's device to the buyer's device.

The method of the present invention is contemplated to be implemented on the seller's device, the buyer's device, and any servers and processors connecting the seller to the buyer via a wired or wireless connection. Aspects and portions of the method of the present invention may be implemented on a plurality of devices as required.

Both the seller's device and the buyer's device are contemplated to encompass at least one display permitting relevant information to be displayed to the seller and the buyer. Similarly, the devices are contemplated to include one or more inputs (e.g., a keyboard, mouse, touch-sensitive interface, etc.) so that the seller and the buyer may input requested information for processing in the manner discussed herein. The buyer's and seller's devices receive and transmit electronic communication containing sales information from a server with a memory having a non-transitory computer-readable medium, one or more processors, and the ability to receive and transmit information from one or more servers and one or more seller's devices and one or more buyer's devices. In one or more exemplary embodiments, the functions described may be implemented in hardware, software, firmware, or any combination thereof. The functions may be stored on or transmitted over as one or more instructions or code on a non-transitory computer-readable medium, which may include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a non-transitory computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of non-transitory computer-readable media.

Where the method indicates interaction by the seller and the buyer, it should be understood data is being provided by the seller and the buyer to satisfy requirements of the step being discussed. Similarly, it should be understood that the method of the present invention will present one or more screens to the seller and the buyer to prompt input of requested information.

One aspect of the process is that instead of the price of an item being fixed, the price changes within a range that is pre-defined by the seller. Unlike regular auctions, where bidding begins when the initial price is at its lowest, in the process described in this invention, the initial price is at its highest. As the process in this invention continues, the price drops in accordance to a predefined curve or other scheme until it is purchased or it reaches the lowest price that a seller is willing to accept for the item, which is also pre-defined.

There are a number of possible methodologies that may be employed. With reference to FIG. 1, which is at least one embodiment of the present invention, the price is at its highest point when the auction starts. If the service or product is not immediately purchased the price begins to steadily drop from its initial high price to a lower price. The rate of the price drop is linear meaning that it is proportional to the amount of time that has passed since the beginning of the auction.

Figure 2:
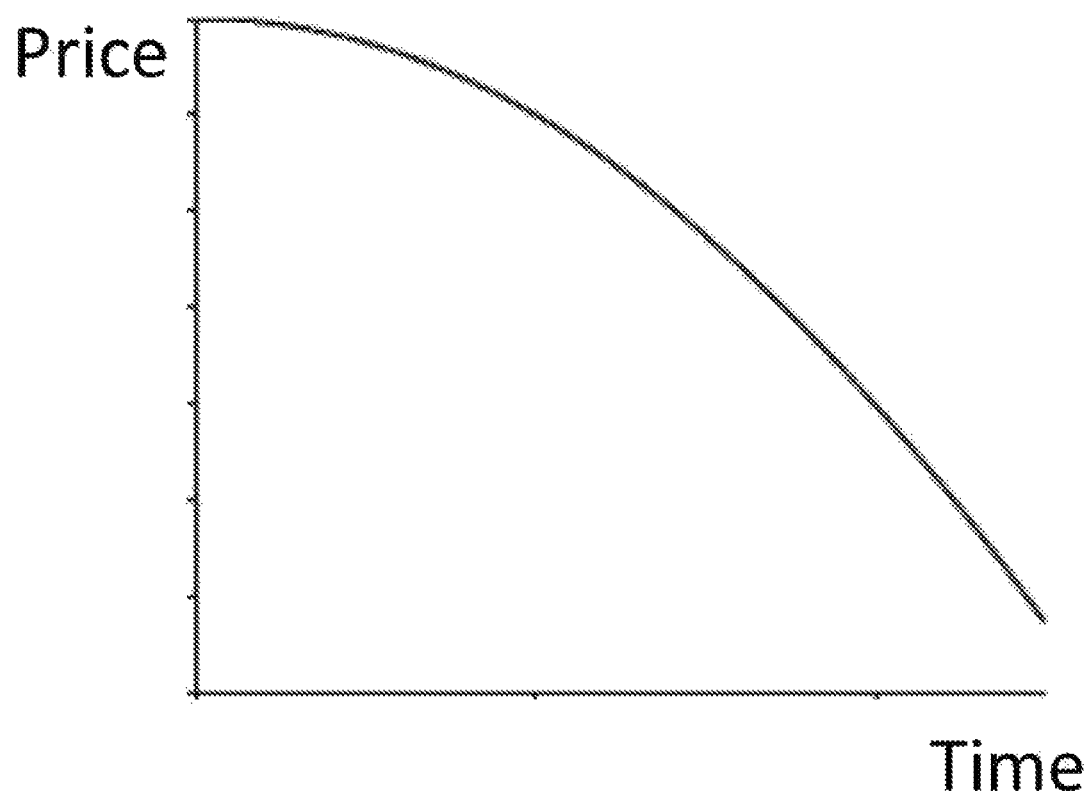
FIG. 2 is another example of a graph of a sales price that initially decreases slowly in at least one embodiment of the method of the present invention.

With reference to FIG. 2, which is at least one embodiment of the present invention, the price is also at its highest point when the auction starts. If the service or product is not immediately purchased the price begins to drop from its initial high price to a lower price. The rate of the price drop may be similar to a reverse logarithmic reduction meaning that the price drops slowly at first, and then more rapidly near the end of the auction.

Figure 3:
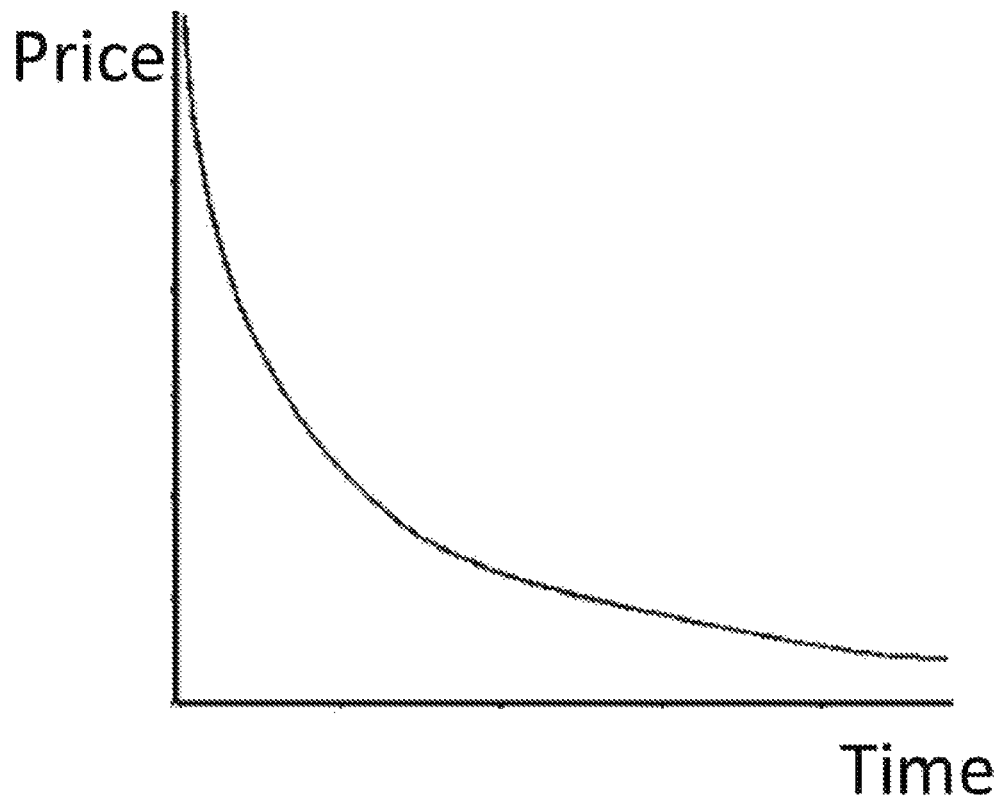
FIG. 3 is yet another example of a graph of a sales price that initially decreases quickly in at least one embodiment of the method of the present invention.

With reference to FIG. 3, which is at least one embodiment of the present invention, the price is also at its highest point when the auction starts. If the service or product is not immediately purchased the price begins to drop from its initial high price to a lower price. The rate of the price drop may be similar to a logarithmic reduction meaning that the price drops quickly at first, and then more slowly near the end of the auction. The curves shown in FIG. 1 through FIG. 3 are only examples of curves that may be used in lowering the sales price during a sale. Thus, the particular curve chosen is not limited to a particular curve or a combination thereof.

The seller can choose how the price drops. There are a number of possible methodologies that may be employed including: linear, curved, asymptotic, or any other predetermined method.

A. Single Item Deal Model

Figure 4:
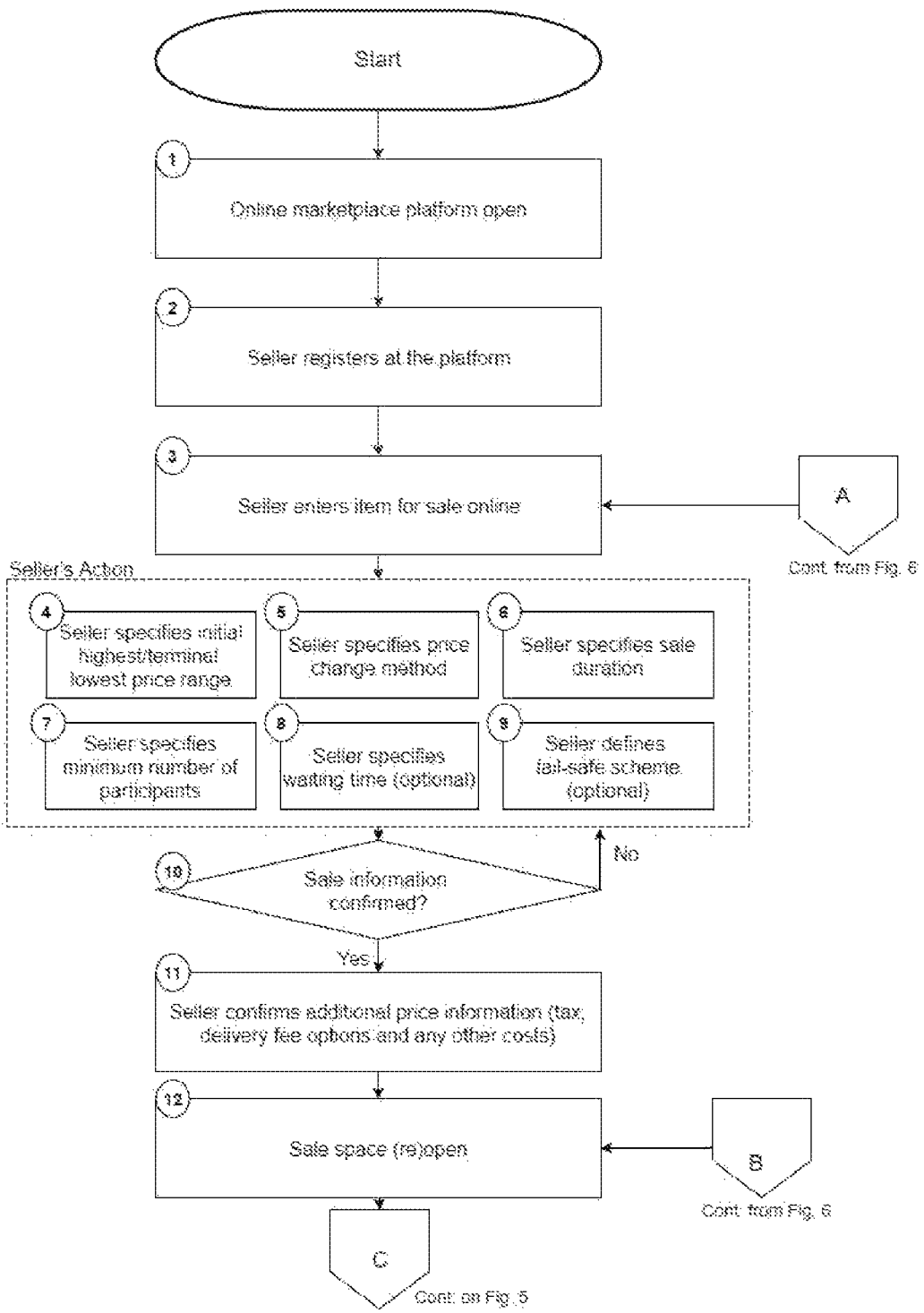
FIG. 4 is a flowchart of the method used for the start of the sale of a single item, which primarily shows the seller's actions in preparing an item for sale that is implemented in at least one embodiment of the method of the present invention.

The model in this example is applied when the seller has one item for sale. The online platform provides a marketplace that enables sellers and buyers to meet and participate in the active sale process. With reference to FIG. 4, the process is described in a flowchart for a single item deal model, which is the method used for the start of the sale of a single item.

Step 1: Online Marketplace Platform Open

With reference to FIG. 4, beginning on top of the flowchart below the oval labeled "Start," the first step is Online Marketplace Platform Open 1. At this point, the online marketplace platform is open for sellers to sell products. The platform provides for an online space, such as a website or mobile app, which has functions for listing and purchasing items.

Step 2: Seller Registers at the Platform

With reference to FIG. 4, the second step is where the seller registers at the platform 2. Once a seller wants to sell an item, the seller is required to register on the platform to participate in the process 2.

Step 3: Seller Enters Item for Sale Online

With reference to FIG. 4, the third step is Seller Enters Item for Sale Online 3. This allows the seller to list an item for sale. The seller inputs item information concerning at least one of the following: specification, brand, function, picture, design, condition, status, etc.

With reference to FIG. 4, steps 4 through 9 describe the seller's actions that may be taken in preparing an item for potential buyers to purchase. These actions are described in further detail below. Note that the sequence of Step 4 through Step 9 does not need to be followed in the order listed. These operations may be executed in any order, as required or as desired.

Step 4: Seller Specifies Initial and Highest and Terminal and Lowest Price Range With reference to FIG. 4, the fourth step is where the seller specifies the initial or highest sales price, along with the terminal or lowest sales price 4. At this point, the seller enters his highest price and his lowest price for the products that he plans to sell. The seller may determine his acceptable price range of the item on factors such as the seller's potential profit, promotional plan, etc. The seller defines the highest expected price and the lowest acceptable price of the item for sale to form the seller's price range.

If the initial price is higher than other ones in other e-commerce markets, buyers will eventually know that the initial price is not competitive. As a result, buyers may wait until the price reaches a competitive level. Thus, the disadvantage of this strategy is that it may consume excessive time until the seller's item is purchased, which may cause the seller to give up participating in the process. Thus, the initial price is recommended to be moderated by considering buyers' behavior.

Step 5: Seller Specifies Price Change Method

With reference to FIG. 4, the fifth step is where the seller specifies the price change method 5. In this step, the seller determines the rate or curve that that the price will drop at from its highest price to its lowest price.

Step 6: Seller Specifies Sale Duration

With reference to FIG. 4, the sixth step is where the seller specifies the duration of the sale 6. In this step, the seller determines the amount of time that it will take for the sale price to drop from its highest price to its lowest price. The seller needs to consider the time-value to set this duration. If the duration is too long for an item, the deal will presumably be made late. On the other hand, if the duration is too short, for example, just a few seconds, participants (also referred to herein as "buyers") may not have a chance to easily track the price drop. The duration may be freely set by the seller, or selected from options that the platform recommends.

Step 7: Seller Specifies Minimum Number of Participants

With reference to FIG. 4, the seventh step is where the seller specifies the minimum number of participants 7. In this step, the seller may determine the minimum number of participants required before the buying and selling process begins. The sale process is based on competition among participants. Once the selling begins, the asking price continually decreases, until either a buyer purchases the commodity or the sales period ends. The first participant who accepts the asking price will get the commodity. If a buyer accepts the asking price shortly after the beginning of the sale, the selling price will be near its highest price. On the other hand, if a buyer accepts the asking price near the end of the selling period, the selling price will be near its lowest price.

The process takes advantage of the tension between waiting for a short period of time before the product is purchased to increase the probability of winning with the disadvantage of paying a higher price ("less-wait and increase-winning-probability") and waiting a longer time before trying to purchase the product at a lower price, but with a lower chance of purchasing the product, since someone else may purchase it first ("more-wait and lower-price"). In general, the selling price may tend to be higher if there are more participants in the marketplace ready to buy the commodity, as there may be more competition. However, it may take more time to wait until many participants are on board. In this regard, the seller needs to consider a proper number of participants.

Step 8: Seller Specifies Sale Hold Waiting Time (Optional)

With reference to FIG. 4, the eighth step is where the seller may optionally specify a sale hold waiting time 8. In this step, the seller may determine a waiting time before the buying and selling process begins. The platform may be equipped with a system to notify the seller and participants if the sale does not start because the minimum number of participants is not reached. Optionally, the seller may set a waiting time to be notified before the participants are notified that the minimum number of participants was not reached, so that the seller can reconsider or withdraw the sale in advance.

Step 9: Seller Defines Fail-Safe Scheme (Optional)

With reference to FIG. 4, the ninth step is where the seller optionally defines a fail-safe scheme 9. In this step, the seller may set the automated plan to repeat the sale using the same setting, if the first sale is unsuccessful. Alternatively, the seller may adjust settings.

Step 10: Sale Information Confirmed?

With reference to FIG. 4, the tenth step is where the seller confirms the sales information 10. In this step, the seller determines if the sale information as defined in the previous steps 4 through 9 is correct. If not, the previous steps may be repeated. If so, the eleventh step is implemented.

Step 11: Seller Confirms Additional Price Information

With reference to FIG. 4, the eleventh step is where the seller confirms additional price information, such as tax, delivery fee options, and other costs 11. In this step, the seller enters the sale price of the item any additional price information that may affect the overall price.

The virtual marketplace assumes that the item will be mailed after an agreement is reached. This may include an additional delivery charge and other costs such as tax. The seller may specify the duration of delivery from slow at a reduced delivery cost to fast at a higher delivery cost. All this information is to be acknowledged by participants prior to the sale process taking place.

Step 12: Sale Space (Re)Open

When the sale information is confirmed, the platform opens a marketplace online. With reference to FIG. 4, the next step is where the sale space opens for selling the products online 12. In this step, the seller opens a marketplace that can be seen by the potential buyers. If at least one cycle of the sale process has already been completed as detailed in steps 13 to 33, the sales space would be reopening at this point, which may be after the seller changes settings or after a waiting time is completed. The potential buyers include may include participants who are already signed up or guests visiting the platform without membership.

Figure 5:
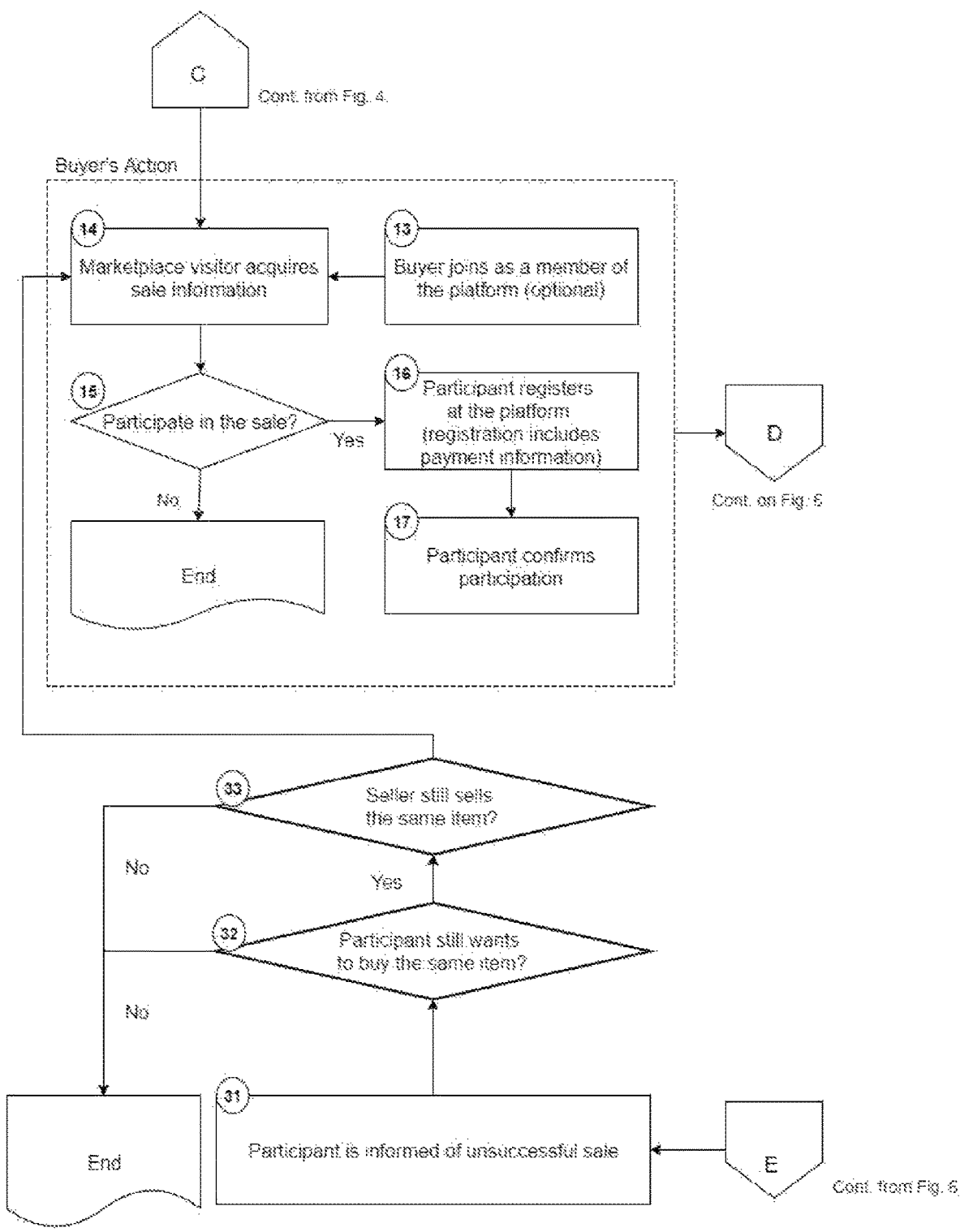
FIG. 5 is a flowchart of the method used once the sale begins for a single item, which primarily shows the buyer's actions in determining whether to purchase an item for sale and the steps taken in the event of an unsuccessful sale in at least one embodiment of the method of the present invention.

FIG. 5 is a flowchart of the method used once the sale begins for a single item that is used in at least one embodiment of the method of the present invention. With reference to FIG. 5, steps 13 through 17 denote buyers' viewpoints as the sale process is mutual actions of the seller and the buyer. First, potential buyers may visit the website or mobile app for searching items. These potential buyers can see items that have confirmed sale information through the previous steps. The potential buyer will acquire all information with or without membership through registration.

Step 13: Buyer Joins as a Member of the Platform (Optional)

With reference to FIG. 5, step thirteen, entitled "Buyer Joins as a Member of the Platform (optional)" 13 can happen any time after the platform exists.

Step 14: Marketplace Visitor Acquires Sale Information

With reference to FIG. 5, if the sale space is open, step fourteen begins, which is entitled "Marketplace Visitor Acquires Sale Information" 14. This information is provided by the seller in steps 3 through 11.

Step 15: Participate in the Sale

With reference to FIG. 5, if the marketplace visitor or member, who is a potential buyer, acquires sale information, then the next step is the fifteenth step which is entitled "Participate in the Sale" 15. At this point, the potential buyer decides whether to participate in a sale. The potential buyer may express interest and decide whether to participate in the sale if the marketplace is open. A potential buyer may participate in multiple marketplaces at the same time. If he decides not to, the process ends for him.

Step 16: Participant Registers at the Platform

With reference to FIG. 5, if the potential buyer decides to participate in a sale, the next step is the sixteenth step, "Participant Registers at the Platform (registration includes payment information)" 16. In this step, the participant registers at the platform, so that he may participate in the sale. The participant may register in the platform either as a member or a non-member participant. The registration requires the participant to input payment information as the sale winner will immediately be charged the cost of the item. This step may be skipped if the participant already registered as a member of the platform. Also, if the participant already registered as a member of the platform, some of the information can be skipped if it was previously entered.

Step 17: Participant Confirms Participation

With reference to FIG. 5, after the participant registers, the next step is the seventeenth step, "Participant Confirms Participation" 17, where the participant confirms that all the information he entered is correct. The potential buyer also confirms he will be a participant for the designated sale.

Step 18: Participants on Board? (Number of Minimum Participants Met)

Figure 6:
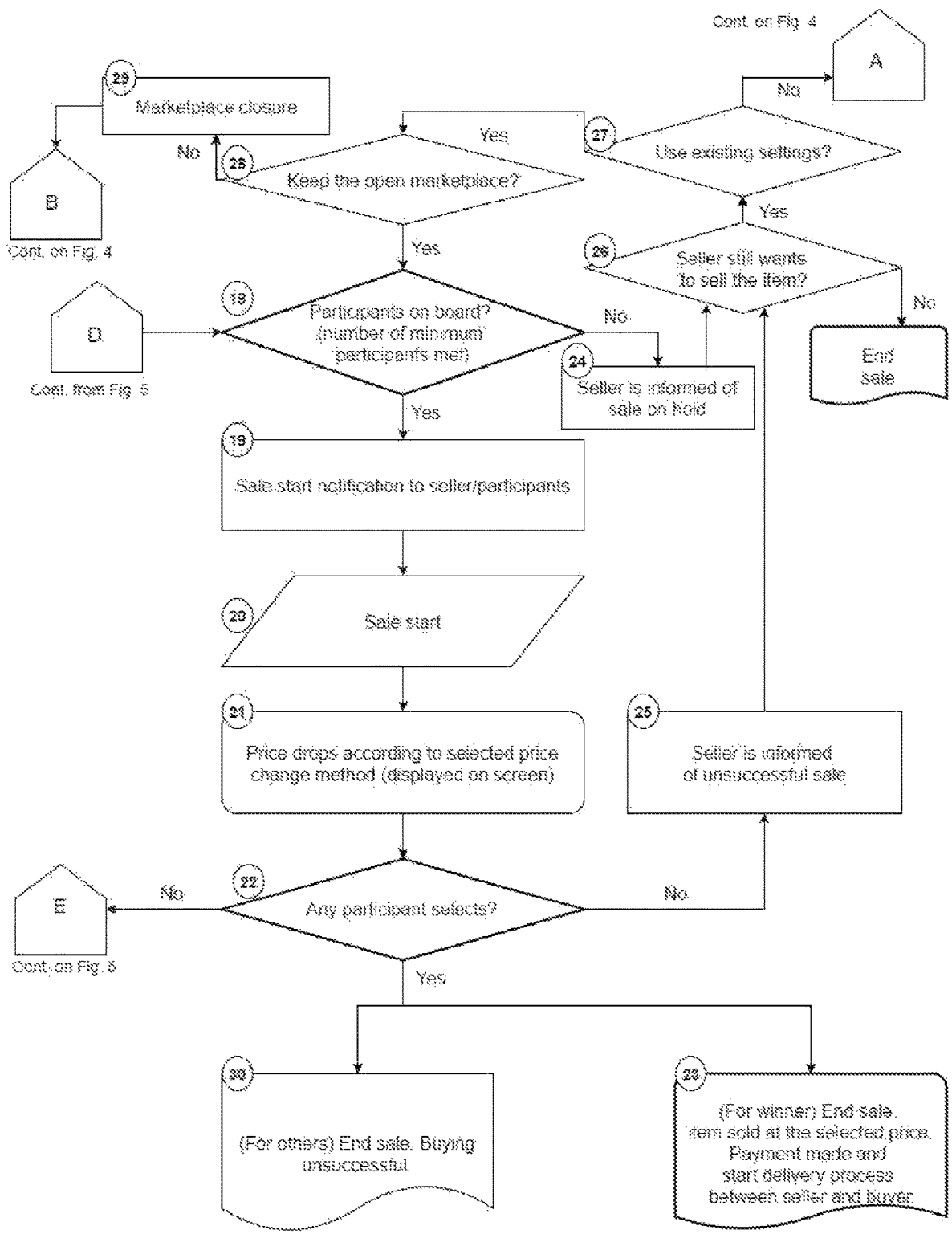
FIG. 6 is a flowchart of the method for the sale of a single item, which primarily shows the sale process after the participants are on board, including how the price drops until a buyer purchases an item or the sale ends and the steps taken in the event of a successful sale in at least one embodiment of the method of the present invention.

With reference to FIG. 6, the next step is the eighteenth step, which asks "Participants on Board? (Number of Minimum Participants Met)" 18. This step determines if the minimum number of participants are on board. If yes, the process moves to the nineteenth step, which is "Sale Start Notification to Seller and Participants" 19. If no, the process moves to the twenty-fourth step, which is "Seller is informed of sale on hold" 24.

Step 24: Seller is Informed of Sale on Hold

If the minimum number of participants is not met in step 18, then the process moves to the twenty-fourth step, which is "Seller is informed of sale on hold" 24. If the number of participants is less than the requirement set in Step 7 for a predetermined amount of time, the seller will be informed of the delay. The platform may have an automated notification system in case of delay, but the seller may also set the duration of waiting in Step 8.

Step 26: Seller Still Wants to Sell the Item

After the seller is informed of the sale on hold in step 24, the process goes to the twenty-sixth step, which is "Seller Still Wants to Sell the Item?" 26 as shown in FIG. 6. If not, the sale ends. If so, the process goes to the twenty-seventh step, which is "Use Existing Settings?" 27.

Step 27: Use Existing Settings?

In this step, the seller decides if he should use the same settings used previously in steps 4 through 9 for another sale, or if he desires to change them. If the seller wants to revise any of the existing settings, or completely restart the process, the process goes back to the third step, which is "Seller Enters Item for Sale Online" 3 with reference to FIG. 4. This allows the seller to list the products for sale.

Step 28: Keep the Open Marketplace?

If the seller still wants to sell the item and use the existing settings, the process goes to the twenty-eighth step, which is "Keep the Open Marketplace?" 28. At this point, the seller determines if he wants to keep the marketplace open. The seller may set the number of attempts using the same settings as described in step 9, in case the sale is not successful.

Step 29: Marketplace Closure

With reference to FIG. 6, if the seller does not want to keep the marketplace open and wants to re-open the sale space, the process goes to the twenty-ninth step, "Marketplace Closure" 29. With reference to FIG. 4, if the seller does want to keep the marketplace open, the process goes back to step twelve, which is "Sale Space (Re)open" 12.

Step 19: Sale Start Notification to Seller and Participants

If the minimum number of participants is met in step 18, then the process moves to the nineteenth step, which is "Sale Start Notification to Seller and Participants" 19, where the seller and participants are notified of the start of the sale as shown in FIG. 6. In this step, the number of participants may exceed or stay under the minimum requirement because the participant number check is done in Step 18, and participants can freely join or drop out by this stage.

Step 20: Sale Start

With reference to FIG. 6, the twentieth step is "Sale Start" 20, where the sale starts. At this point, the marketplace becomes invisible for new platform visitors. No more participants can join after this stage.

Step 21: Price Drops According to Selected Price Change Method

With reference to FIG. 6, the twenty-first step is "Price Drops According to Selected Price Change Method (Displayed on Screen)" 21. During this process, the sales price drops in accordance to a predetermined curve, such as the ones shown in FIG. 1 through 3. The price drops according to the seller's action that is planned in Steps 4 through 9 as shown in FIG. 4. The price changes from the initial price or highest price to the terminal or lowest price as specified in step 4 over the duration specified in step 6 according to the change method as specified in step 5. The price change is to be displayed on screen in the marketplace and both the seller and the participants can see the remaining time until the sale ends. To this point, it is contemplated that a countdown clock may be displayed to the seller on the seller's device and to the buyer on the buyer's device. The countdown clock provides visual assistance to the seller and the buyer by highlighting the amount of time remaining until the end of the sale for the item. During Step 21, participants watch price changes in a given time period. Any participant who first selects the price during the sale will be the winner of the competition and eventually buy the item. The selection can be done by a designated method such as clicking an icon on screen, pressing space bar or enter key, or any other user friendly way that was acknowledged by the participant.

Step 22: Any Participant Selects

With reference to FIG. 6, the twenty-second step asks "Any Participant Selects?" 22. This step determines if any of the participants selected an item for sale.

Step 23: (For Winner) End Sale, Item Sold at the Selected Price. Payment Made and Start Delivery Process Between Seller and Buyer.

The participant who won the sale will buy the item using the payment information input in Step 16 with reference to FIG. 5. The seller is informed of the deal and starts delivery process. If participants do select an item for sale, with reference to FIG. 6, the process moves to the twenty-third step, for the winning buyer, which is "(For Winner) End Sale, Item Sold at the Selected Price. Payment Made and Start Delivery Process Between Seller and Buyer." 23.

Step 30: (For Others) End Sale. Buying Unsuccessful

After step 22, for other participants who have participated in the sale but not won the deal, the sale is over.

Step 31: Participant is Informed of Unsuccessful Sale

Note that with reference to FIG. 6, if no participants select the item for sale in the twenty-second step, which is "Any Participant Selects?" 22, the process also goes to the thirty-first step as shown on FIG. 5, which is "Participant is Informed of Unsuccessful Sale" 31. In this step, the buyers are informed that the sale ended, because no one selected the item for sale.

Step 32: Participant Still Wants to Buy the Same Item?

With reference to FIG. 5, the next step is the thirty-second step of "Participant Still Wants to Buy the Same Item" 32. If no, the sale ends. If the sale is not made, there is a chance for the participant to engage in another sale.

Step 33: Seller Still Sells the Same Item?

If yes, with reference to FIG. 5, the process goes to the thirty-third step is "Seller Still Sells the Same Item?" 33. If yes, with reference to FIG. 5, the process goes back to the fourteenth step, "Marketplace Visitor Acquires Sale Information" 14. If no, the sale ends. It is not necessarily required to show methods to the participants. The seller may choose from other options not presented here, or create his own scheme, if relevant. At this point, with reference to FIG. 5, the new or re-participating potential buyers proceed to step 13 through 17, where the buyer's actions take place to engage in another sales process.

Step 25: Seller is Informed of Unsuccessful Sale

With reference to FIG. 6, if no participants select the item, then after the twenty-second step, which is "Any Participant Selects?" 22, the process goes to the twenty-fifth step, which is "Seller Is Informed of Unsuccessful Sale" 25.

Even if the sale process were undertaken, no one may select to buy the item in the price range in the given period. Then, the sale is not successful. When no one buys the item, the deal is not made for this time and the seller will be informed. The seller is then required to decide whether to reopen the sale. This step is dependent on Steps 26, 27 and 28 as described above. If the seller stops selling the item, then there will be no chance for participants to re-participate in another sale. If the seller still wants to sell the item, the seller may use the existing settings or change settings. In this step, the seller may also decide to maintain the existing marketplace, reopen a marketplace using the same settings, or open a new marketplace with different settings. Such information is available in Step 14, and the participants may decide to participate in the sale again in Step 15.

B. Multiple Items Deal Model

This model is applied when the seller has an item with multiple stock, a model with different specifications (e.g. color), or different items that the seller wants to sell all of them in this marketplace. It basically follows the same flow as used in the Single Item Deal Model and uses the same contents described in the model, but has some additional steps described below and in the flowchart "Multiple Items Deal Model" as described in detail in FIG. 7 through 9.

Step 1: Online Marketplace Platform Open

Figure 7:
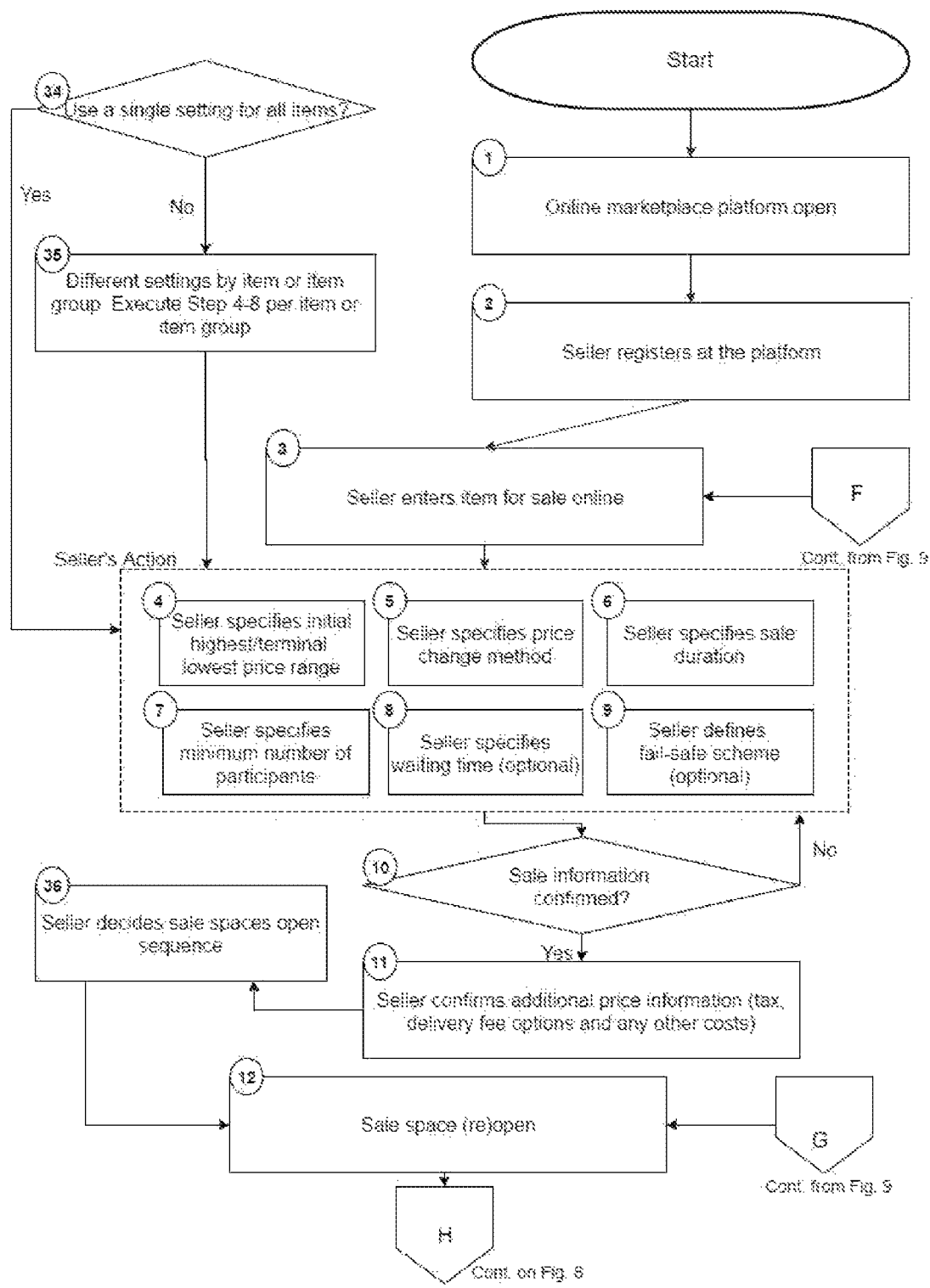
FIG. 7 is a flowchart of the method used for the start of the sale of multiple items, which primarily shows the seller's actions in preparing an item for sale in at least one embodiment of the method of the present invention.

With reference to FIG. 7, beginning in the upper right hand corner below the oval labeled "Start," the first step is Online Marketplace Platform Open 1. At this point, the online marketplace platform is open for sellers to sell products and buyers to buy products. The platform provides for an online space, such as a website or mobile app, which has functions for listing and purchasing items. Sellers and buyers can register on the platform to participate in deals.

Step 2: Seller Registers at the Platform

With reference to FIG. 7, the second step is Seller Registers at the Platform 2. Once a seller wants to sell one or more items, the seller is required to register on the platform to participate in the process 2. This allows the seller to engage in the selling of products.

Step 3: Seller Enters Item for Sale Online

With reference to FIG. 7, the third step is Seller Enters Item for Sale Online 3. This allows the seller to list the products for sale. The seller inputs item information concerning at least one of the following: item specification, brand, function, picture, design, condition, status, etc. With reference to FIG. 7, steps 4 through 9 describe the seller's actions that may take place in preparing an item for potential buyers to purchase. These actions are described in further detail below.

Step 4: Seller Specifies Initial and Highest and Terminal and Lowest Price Range With reference to FIG. 7, the fourth step is Seller Specifies Initial and Highest and Terminal and Lowest Price Range 4. At this point, the seller enters his highest price and his lowest price for the products that he plans to sell. The seller may determine his acceptable price range of the item on factors such as the seller's potential profit and promotional plan. The seller defines the highest expected price and the lowest acceptable price of the item for sale to form the seller's price range.

Step 5: Seller Specifies Price Change Method

With reference to FIG. 7, the fifth step is Seller Specifies Price Change Method 5. In this step, the seller determines the rate or curve that that the price will drop at from its highest price to its lowest price.

Step 6: Seller Specifies Sale Duration

With reference to FIG. 7, the sixth step is "Seller Specifies Sale Duration" 6. In this step, the seller determines the amount of time that it will require for the sale price to drop from the highest price to the lowest price. The duration may be freely set by the seller, or selected from the options that the platform recommends.

Step 7: Seller Specifies Minimum Number of Participants

With reference to FIG. 7, the seventh step is Seller Specifies Minimum Number of Participants 7. In this step, the seller may determine the minimum number of participants required before the buying and selling process begins.

Step 8: Seller Specifies Sale Hold Waiting Time (Optional)

With reference to FIG. 7, the eighth step is Seller Specifies Sale Hold Waiting Time (Optional) 8. In this step, the seller may determine a waiting time before the buying and selling process begins.

Step 9: Seller Defines Fail-Safe Scheme (Optional)

With reference to FIG. 7, the ninth step is Seller Defines Fail-Safe Scheme (Optional) 9. In this step, the seller may determine a fail-safe scheme if desired. The seller can set the automated plan to repeat the sale using the same setting, if the first sale is unsuccessful. Alternatively, the seller may adjust settings.

Step 10: Sale Information Confirmed?

With reference to FIG. 7, the tenth step is "Sale Information Confirmed?" 10. In this step, it is determined if the sale information as defined in the previous steps 4 through 9 is confirmed. If not, the previous steps may be repeated.

Step 11: Seller Confirms Additional Price Information

With reference to FIG. 7, the eleventh step is "Seller confirms additional price information (tax, delivery fee options and any other costs)" 11. In this step, the seller enters the sale price of the item and any additional price information that may affect the overall price. This includes, but is not limited to, tax, delivery, shipping, handling, etc.

Step 36: Seller Decides Sale Spaces Open Sequence

In step 36 as shown in FIG. 7, the seller can decide the sequence of opening sale spaces. Each item or item group may or may not have the same settings. The seller may open only one item in the platform so that visitors can see only one item from the seller until the deal is started and a new marketplace is open for the same item (new stock). Or, the seller may open multiple marketplaces with the same or different settings for the same or different items at the same time. Moreover, the seller may differentiate settings for the same item with multiple stock as deals proceed (e.g. sequentially shortening duration in the next deal, sequentially reducing the initial price in the next deal). Unlike the Single Item Deal Model, it is assumed that there is more stock of the same item for sale. The participants who were unsuccessful in the first deal may participate again in the sale for the same item.

Step 12: Sale Space (Re)Open

With reference to FIG. 7, after the additional price information is entered in step 11, step 12 begins, which is entitled, "Sale Space (Re)open" 12. At this point, the seller opens a marketplace that can be seen by the potential buyers. "Sale Space (Re)open" refers to the situation when at least one cycle of the sale process (successful or unsuccessful sale throughout steps from 13 to 33) is finished or the seller changes settings after a waiting time (step 8) if activated. The potential buyers include members who already signed up or guests visiting the platform without membership. When the sale information is confirmed, the platform opens a marketplace online. Depending on step 24 through 28, as shown on FIG. 9, the marketplace can reopen if a deal is not made in the later steps.

Figure 8:
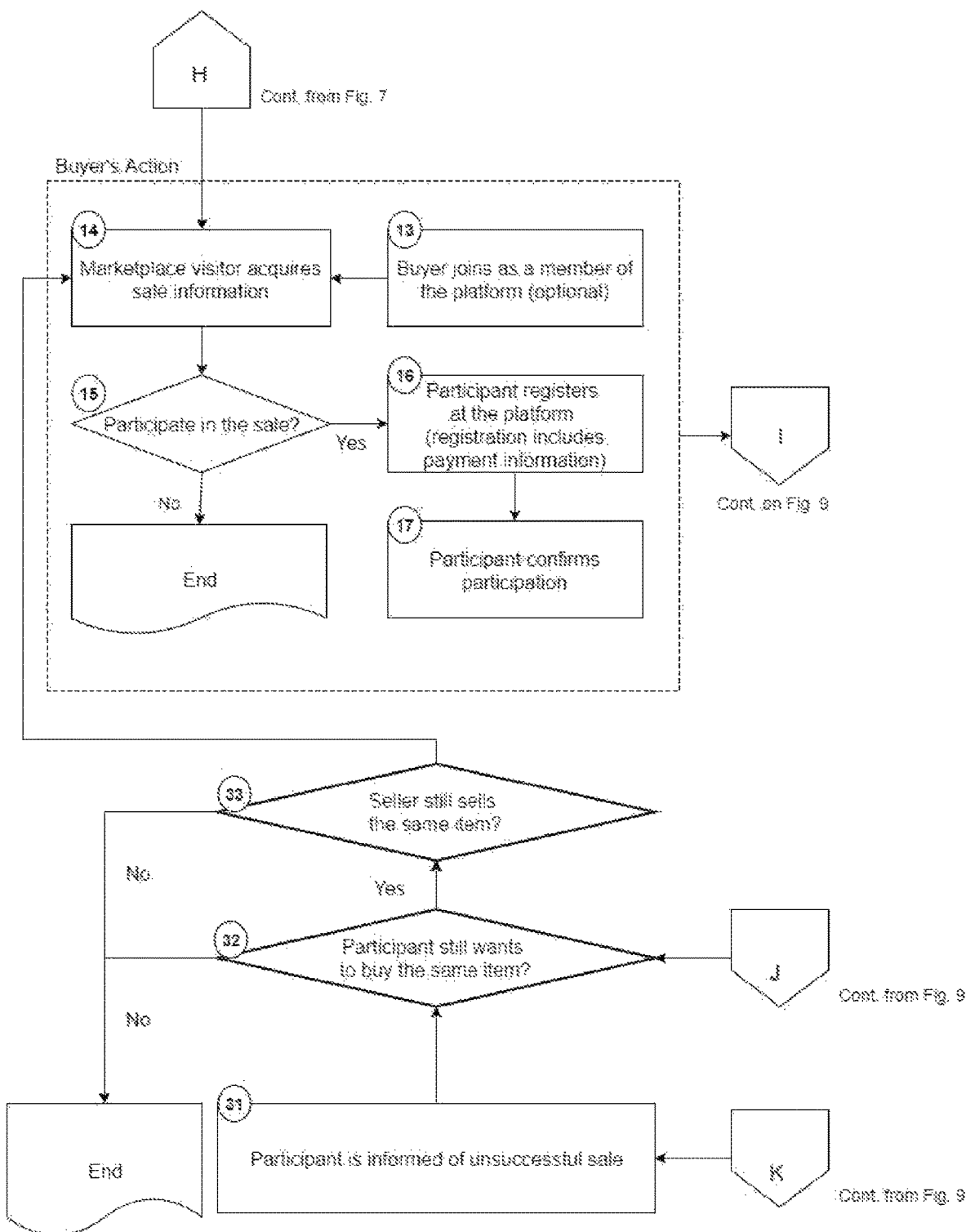
FIG. 8 is a flowchart of the method used once the sale begins for multiple items, which primarily shows the buyer's actions in determining whether to purchase an item for sale and the steps that are taken in the event of an unsuccessful sale in at least one embodiment of the method of the present invention.

FIG. 8 is a flowchart of the method used once the sale begins for a single item that is used in at least one embodiment of the method of the present invention. With reference to FIG. 8, steps 13 through 17 denote buyers' viewpoints as the sale process is mutual actions of the seller and the buyer. First, potential buyers may visit the website or mobile app for searching items. These potential buyers can see items that have confirmed sale information through the previous steps. The potential buyer will acquire all information with or without membership through registration.

Step 13: Buyer Joins as a Member of the Platform (Optional)

With reference to FIG. 8, step thirteen, entitled "Buyer Joins as a Member of the Platform (optional)" 13 can happen any time after the platform opens.

Step 14: Marketplace Visitor Acquires Sale Information

With reference to FIG. 8, if the sale space is open, step fourteen begins, which is entitled "Marketplace Visitor Acquires Sale Information" 14. This information is provided by the seller in steps 3 through 11.

Step 15: Participate in the Sale

With reference to FIG. 8, if the marketplace visitor or member, who is a potential buyer, acquires sale information, then the next step is the fifteenth step which is entitled "Participate in the Sale" 15. At this point, the potential buyer decides whether to participate in a sale. The potential buyer may express interest and decide whether to participate in the sale if the marketplace is open until the participant joins. A potential buyer may participate in multiple marketplaces at the same time. If he decides not to, the process ends for him.

Step 16: Participant Registers at the Platform

With reference to FIG. 8, if the potential buyer decides to participate in a sale, the next step is the sixteenth step, "Participant Registers at the Platform (registration includes payment information)" 16. In this step, the participant registers at the platform, so that he may participate in the sale. The participant may register in the platform either as a member or a non-member participant. The registration requires the participant to input payment information as the sale winner will immediately be charged the cost of the item. This step may be skipped if the participant already registered as a member of the platform. Also, if the participant already registered as a member of the platform, some of the information can be skipped as it is prefilled.

Step 17: Participant Confirms Participation

With reference to FIG. 8, after the participant registers, the next step is the seventeenth step, "Participant Confirms Participation" 17, where the participant confirms that all the information he entered is correct. The potential buyer confirms to be a participant for the designated sale through various ways.

Step 18: Participants on Board? (Number of Minimum Participants Met)

Figure 9:
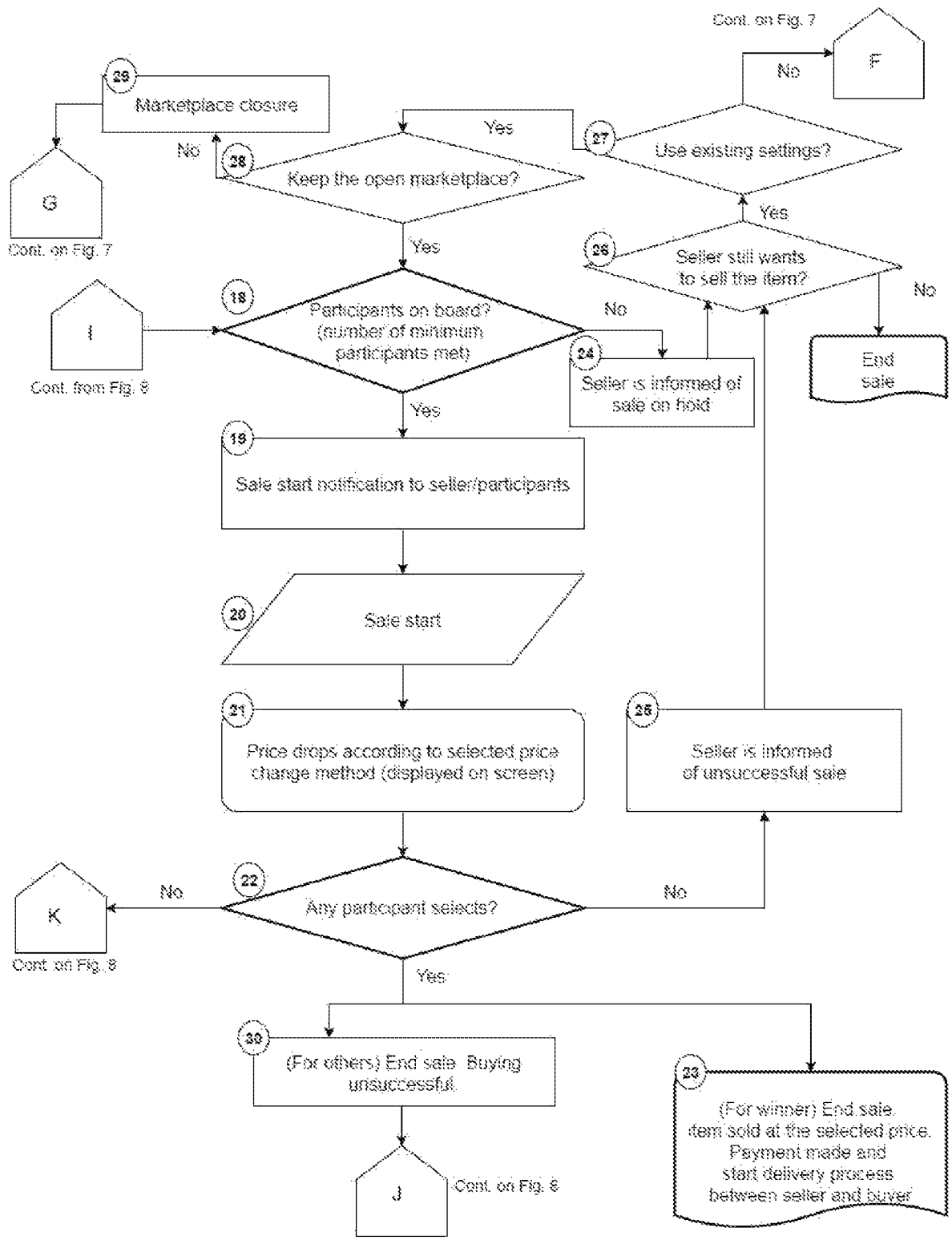
FIG. 9 is a flowchart of the method used for the end of the sale of multiple items, which primarily shows the sale process after the participants are on board, including how the price drops until a buyer purchases an item or the sale ends and the steps taken in the event of a successful sale in at least one embodiment of the method of the present invention.

With reference to FIG. 9, the next step is the eighteenth step, which asks if "Participants on Board? (Number of Minimum Participants Met)" 18. This step determines if the minimum number of participants are on board. If yes, the process moves to the nineteenth step, which is "Sale Start Notification to Seller and Participants" 19. If no, the process moves to the twenty-fourth step, which is "Seller is informed of sale on hold" 24.

Step 24: Seller is Informed of Sale on Hold

If the minimum number of participants is not met in step 18, then the process moves to the twenty-fourth step, which is "Seller is informed of sale on hold" 24. If the number of participants is less than the requirement set in Step 7 for a predetermined amount of time, the seller will be informed of the delay. The platform may have an automated notification system in case of delay, but the seller may also set the duration of waiting in Step 8.

Step 26: Seller Still Wants to Sell the Item

After the seller is informed of the sale on hold in step 24, the process goes to the twenty-sixth step, which is "Seller Still Wants to Sell the Item?" 26 as shown in FIG. 9. If not, the sale ends. If so, the process goes to the twenty-seventh step, which is "Use Existing Settings?" 27.

Step 27: Use Existing Settings?

In this step, the seller decides if he should use the same settings used previously in steps 4 through 9 for another sale, or if he desires to change them. If the seller wants to revise any of the existing settings, or completely restart the process, the process goes back to the third step, which is "Seller Enters Item for Sale Online" 3 with reference to FIG. 7. This allows the seller to list the products for sale.

If the seller still wants to sell the item and use the existing settings, the process goes to the twenty-eighth step, which is "Keep the Open Marketplace?" 28. At this point, the seller determines if he wants to keep the marketplace open. The seller may set the number of attempts using the same settings in advance (Step 9), assuming the sale may not be always successful.

Step 28: Keep the Open Marketplace?

In the twenty-eighth step, which is "Keep the Open Marketplace?" 28, in reference to FIG. 9, the seller needs to decide whether to keep the existing marketplace open, or close it.

Step 29: Marketplace Closure

If the seller does not want to keep the marketplace open and wants to re-open the sale space, with reference to FIG. 9, the process goes to the twenty-ninth step, "Marketplace Closure" 29. After this, with reference to FIG. 7, if the seller does want to keep the marketplace open, the process goes back to step twelve, which is "Sale Space (Re)open" 12. At this point, with reference to FIG. 8, the new or re-participating potential buyers proceed to step 13 through 17, where the buyer's actions take place to engage in another sales process.

Step 19: Sale Start Notification to Seller and Participants

If the minimum number of participants is met in step 18, then the process moves to the nineteenth step, which is "Sale Start Notification to Seller and Participants" 19, where the seller and participants are notified of the start of the sale as shown in FIG. 9. When all interested parties are ready, the platform notifies the start of the sale to the parties. At this point, the number of participants may exceed or stay under the minimum requirement because the participant number check is done in Step 18, and participants can freely join or drop out by this stage.

Step 20: Sale Start

With reference to FIG. 9, the twentieth step is "Sale Start" 20, where the sale starts. At this point, the marketplace becomes invisible for new platform visitors. No more participants can join from this stage.

Step 21: Price Drops According To Selected Price Change Method

With reference to FIG. 9, the twenty-first step is "Price Drops According to Selected Price Change Method (Displayed on Screen)" 21. During this process, the sales price drops in accordance to a predetermined curve, such as the ones shown in FIG. 1 through 3. The price drops according to the seller's action that is planned in Steps 4 through 9 as shown in FIG. 7. The price changes from the initial price to the bottom price (Step 4) for the designated duration (Step 6) according to a certain decrease scheme (Step 5). The price change is to be displayed on screen in the marketplace and both the seller and the participants can see the remaining time until the sale ends. To this point, it is contemplated that a countdown clock may be displayed to the seller on the seller's device and to the buyer on the buyer's device. The countdown clock provides visual assistance to the seller and the buyer by highlighting the amount of time remaining until the end of the sale for the item. During Step 21, participants watch price changes in a given time period. Any participant who first selects the price during the sale will be the winner of the competition and eventually buy the item. The selection can be done by a designated method such as clicking an icon on screen, pressing space bar or enter key, or any other user friendly way that was acknowledged by the participant.

Step 22: Any Participant Selects

With reference to FIG. 9, the twenty-second step asks "Any Participant Selects?" 22. This step determines if any of the participants selected an item for sale.

Step 23: (For Winner) End Sale, Item Sold at the Selected Price. Payment Made and Start Delivery Process Between Seller and Buyer.

The participant who won the sale will buy the item using the payment information input in Step 16 with reference to FIG. 8. The seller is informed of the deal and starts delivery process. If participants do select an item for sale, with reference to FIG. 9, the process moves to the twenty-third step, for the winning buyer, which is "(For Winner) End Sale, Item Sold at the Selected Price. Payment Made and Start Delivery Process Between Seller and Buyer." 23.

Step 30: (For Others) End sale. Buying Unsuccessful

After step 22, for other participants who have participated in the sale but not won the deal, the sale is over.

Step 31: Participant is Informed of Unsuccessful Sale

Note that with reference to FIG. 9, if no participants select the item for sale in the twenty-second step, which is "Any Participant Selects?" 22, the process also goes to the thirty-first step as shown on FIG. 8, which is "Participant is Informed of Unsuccessful Sale" 31. In this step, the buyers are informed that the sale ended, because no one selected the item for sale.

Step 32: Participant Still Wants to Buy the Same Item?

With reference to FIG. 8, the next step is the thirty-second step of "Participant Still Wants to Buy the Same Item" 32. If no, the sale ends. The participant may decide whether to continue participating in the sale.

Step 33: Seller Still Sells the Same Item?

If yes, with reference to FIG. 8, the process goes to the thirty-third step is "Seller Still Sells the Same Item?" 33. If yes, with reference to FIG. 8, the process goes back to the fourteenth step, "Marketplace Visitor Acquires Sale Information" 14. If no, the sale ends. It is not necessarily required to show methods to the participants. The seller may choose from other options not presented here, or create his own scheme, if relevant.

Step 25: Seller is Informed of Unsuccessful Sale

On the other hand, with reference to FIG. 9, if no participants select the item, then after the twenty-second step, which is "Any Participant Selects?" 22, the process goes to the twenty-fifth step, which is "Seller Is Informed of Unsuccessful Sale" 25.

Even if the sale process were undertaken, no one may select to buy the item in the price range in the given period. Then, the sale is not successful. When no one buys the item, the deal is not made for this time and the seller will be informed. The seller is then required to decide whether to reopen the sale. This step is dependent on Steps 26, 27 and 28 as described above. If the seller may stop selling the item, then there will be no chance for participants to re-participate in the same deal. If the seller still wants to sell the item, the seller may use the existing settings or change settings, and decide whether to use the existing marketplace. By this step, the seller is supposed to decide if to maintain the existing marketplace, to reopen a marketplace using the same settings, or open a new marketplace with different settings. Such information is to be available in Step 14, and the participant will decide to Participate in the Sale again in Step 15.

The methods described are intended to be merely exemplary of the scope of the present invention. Those skilled in the art will appreciate that there are equivalents and variations that may be employed. Those equivalents and variations are intended to be encompassed by the present invention.

What is claimed is:

1. A computer-implemented method for calculating an instantaneous sales price at a predetermined time interval from an electronic communication containing buyer information, comprising executing on one or more processors the steps of:
   receiving an electronic communication containing the identity of the seller,
   receiving an electronic communication from the seller identifying one or more items for sale,
   receiving an electronic communication from the seller identifying the initial price of the item for sale,
   receiving an electronic communication from the seller identifying the final price of the item for sale,
   receiving an electronic communication from the seller identifying the price change method of the item for sale,
   receiving an electronic communication from the seller identifying the duration of the sale,
   receiving an electronic communication from the seller identifying the minimum number of participants required for the sale,
   receiving an electronic communication from the seller identifying additional price information regarding the item for sale,
   storing the electronic communications on a server with a memory having a non-transitory computer-readable medium, one or more processors, and the ability to receive and transmit information from the server to one or more seller's devices and one or more buyer's devices,
   sending an electronic communication with the sales information to at least one participants,
   receiving an electronic communication from at least one participant identifying if he desires to participate in the sale,
   determining if the minimum number of participants required for the sale are present,
   notifying the participants of the start of the sale process and displaying one or more items for sale and the initial sales price based on information received from the seller,
   calculating a new instantaneous sales price based on the price change method of the item for sale in accordance with a predetermined algorithm based on a predetermined curve selected from the group consisting of asymptotic, reverse logarithmic reduction, and logarithmic reduction after a predetermined particular period of time wherein the price of an item for sale decreases as the duration of the sale increases,
   monitoring electronic communications to determine if a participant purchases one or more items for sale before the sale ends,
   notifying the seller and participants of the end of the sale process and if they were successful in buying one or more items for sale,
   receiving information from the buyer identifying the buyer's payment information if he is successful in purchasing an item for sale,
   processing the payment from the winning participant, if any, and arranging for delivery of the item purchased or notifying the seller that the sale was unsuccessful, and
   determining if the seller wishes to conduct another sale and the details regarding the sale.

2. The method of claim 1, wherein the time interval for the algorithm is selected from the group consisting of seconds, minutes, hours, and days.

3. The method of claim 1, wherein the seller specifies the waiting time before the sale process begins.

4. The method of claim 1, wherein the seller defines a fail-safe scheme for the sale process.

5. The method of claim 1, wherein the additional price information is selected from the group consisting of tax, delivery fee options, and other costs.

6. The method of claim 1, wherein the buyer joins as a member of the sales platform on the server.

7. The method of claim 1, wherein the seller may start another sales process if a buyer does not purchase the item in the initial sales process.

8. The method of claim 1, wherein the seller may adjust the sales parameters at the start of another sales process if a buyer does not purchase the item in the initial sales process.

9. A non-transitory computer-readable medium for calculating an instantaneous sales price at a predetermined time interval from an electronic communication containing buyer information, comprising instructions stored thereon, that when executed on a processor, perform the steps of:
   receiving an electronic communication containing the identity of the seller,
   receiving an electronic communication from the seller identifying one or more items for sale,
   receiving an electronic communication from the seller identifying the initial price of the item for sale,
   receiving an electronic communication from the seller identifying the final price of the item for sale,
   receiving an electronic communication from the seller identifying the price change method of the item for sale, receiving an electronic communication from the seller identifying the duration of the sale, receiving an electronic communication from the seller identifying the minimum number of participants required for the sale, receiving an electronic communication from the seller identifying additional price information regarding the item for sale, storing the electronic communications on a server with a memory having a non-transitory computer-readable medium, one or more processors, and the ability to receive and transmit information from the server to one or more seller's devices and one or more buyer's devices, sending an electronic communication with the sales information to at least one participants, receiving an electronic communication from at least one participant identifying if he desires to participate in the sale, determining if the minimum number of participants required for the sale are present, notifying the participants of the start of the sale process and displaying one or more items for sale and the initial sales price based on information received from the seller, calculating a new instantaneous sales price based on the price change method of the item for sale in accordance with a predetermined algorithm based on a predetermined curve selected from the group consisting of asymptotic, reverse logarithmic reduction, and logarithmic reduction after a predetermined particular period of time, monitoring electronic communications to determine if a participant purchases one or more items for sale before the sale ends, notifying the seller and participants of the end of the sale process and if they were successful in buying one or more items for sale, receiving information from the buyer identifying the buyer's payment information if he is successful in purchasing an item for sale, processing the payment from the winning participant, if any, and arranging for delivery of the item purchased or notifying the seller that the sale was unsuccessful, and determining if the seller wishes to conduct another sale and the details regarding the sale.

10. The method of claim 9, wherein the time interval for the algorithm is selected from the group consisting of seconds, minutes, hours, and days.

11. The method of claim 9, wherein the seller specifies the waiting time before the sale process begins.

12. The method of claim 9, wherein the seller defines a fail-safe scheme for the sale process.

13. The method of claim 9, wherein the additional price information is selected from the group consisting of tax, delivery fee options, and other costs.

14. The method of claim 9, wherein the buyer joins as a member of the sales platform on the server.

15. The method of claim 9, wherein the seller may start another sales process if a buyer does not purchase the items in the initial sales process.

16. The method of claim 9, wherein the seller may adjust the sales parameters at the start of another sales process if a buyer does not purchase the items in the initial sales process.

* * * * *